US008190887B2

(12) United States Patent
Koo et al.

(10) Patent No.: US 8,190,887 B2
(45) Date of Patent: May 29, 2012

(54) CABLE NETWORK SYSTEM AND METHOD FOR CONTROLLING SECURITY IN CABLE NETWORK ENCRYPTED DYNAMIC MULTICAST SESSION

(75) Inventors: Han Seung Koo, Daejeon (KR); O Hyung Kwon, Daejeon (KR); Yun Jeong Song, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 782 days.

(21) Appl. No.: 12/190,661

(22) Filed: Aug. 13, 2008

(65) Prior Publication Data

US 2009/0144544 A1   Jun. 4, 2009

(30) Foreign Application Priority Data

Dec. 4, 2007   (KR) .................. 10-2007-0125144

(51) Int. Cl.
*G06F 11/30* (2006.01)
(52) U.S. Cl. ........ 713/163; 380/255; 380/277; 713/169; 713/170; 713/171; 713/150; 726/3; 709/208
(58) Field of Classification Search .................. 380/277, 380/255; 713/150, 163, 169, 170, 171; 726/3; 709/208
See application file for complete search history.

(56) References Cited

U.S. PATENT DOCUMENTS

| | | | |
|---|---|---|---|
| 6,049,878 A * | 4/2000 | Caronni et al. .................. 726/3 |
| 6,272,170 B1 * | 8/2001 | Chu .............................. 375/222 |
| 7,701,938 B1 * | 4/2010 | Bernstein et al. ............. 370/390 |
| 7,747,021 B2 * | 6/2010 | Lindteigen et al. ........... 380/274 |
| 2004/0132448 A1 * | 7/2004 | Torres et al. ................... 455/427 |
| 2005/0265398 A1 * | 12/2005 | Chapman et al. ............. 370/509 |
| 2008/0209489 A1 * | 8/2008 | Joyce et al. ................... 725/111 |
| 2008/0212598 A1 * | 9/2008 | Kolli et al. ..................... 370/409 |
| 2009/0193486 A1 * | 7/2009 | Patel et al. ..................... 725/114 |

FOREIGN PATENT DOCUMENTS

| | | |
|---|---|---|
| KR | 1020030048464 A | 6/2003 |
| KR | 1020030068395 A | 8/2003 |
| KR | 1020050066792 A | 6/2006 |
| WO | 2006/124326 A1 | 11/2006 |

OTHER PUBLICATIONS

L. Todd Heberlein; Network security monitor; Jun. 6 1991; IEEE, pp. 1-12.*
David Fellows, et al; "DOCSIS™ Cable Modem Technology" IEEE Communications Magazine, Mar. 2001, pp. 202-209.

* cited by examiner

*Primary Examiner* — April Shan
(74) *Attorney, Agent, or Firm* — Ladas & Parry LLP (57) ABSTRACT

A security control method in a cable network dynamic multicast session, and more particularly, a method of controlling forward secrecy and backward secrecy in a Data Over Cable Service Interface Specifications (DOCSIS) 3.0 network dynamic multicast session is provided. A security control method in a cable network dynamic multicast session, includes: maintaining a multicast group that is allocated with a first Downstream Service Identifier (DSID) and a first Security Association Identifier (SAID) and that is joined by a first cable modem and a second cable modem; receiving a Leave-MulticastSession message from the second cable modem; exchanging, corresponding to the LeaveMulticastSession message, a Dynamic Bonding Change (DBC) message for changing a multicast parameter with the second cable modem; and updating a first Traffic Encryption Key (TEK) corresponding to the first DSID with a second TEK.

19 Claims, 7 Drawing Sheets

CABLE NETWORK SYSTEM AND METHOD FOR CONTROLLING SECURITY IN CABLE NETWORK ENCRYPTED DYNAMIC MULTICAST SESSION

CROSS-REFERENCE TO RELATED APPLICATION

This application claims priority from Korean Patent Application No. 10-2007-0125144, filed on Dec. 4, 2007, in the Korean Intellectual Property Office, the entire disclosure of which is incorporated herein by reference.

BACKGROUND OF THE INVENTION

1. Field of the Invention

The present invention relates to a security control method in a cable network dynamic multicast session, and more particularly, to a method of controlling forward secrecy and backward secrecy in a Data Over Cable Service Interface Specifications (DOCSIS) 3.0 network dynamic multicast session.

This work was supported by the IT R&D program of MIC/IITA. [2007-S-007-01, The Development of Downloadable Conditional Access System]

2. Description of Related Art

A Data Over Cable Service Interface Specifications (DOCSIS) 3.0 network supports an Internet data speed of greater than or equal to downward maximum 480 Mbps and of greater than or equal to upward maximum 120 Mbps in a hybrid fiber coax (HFC) network, using a channel bonding technology. Currently, a DOCSIS3.0 standard defines a Media Access Control (MAC) technology, a physical layer (PHY) technology, and a DOCSIS3.0 security. The DOCSIS3.0 security technology supports privacy through encryption with respect to data transferred between cable modems and a cable model termination system (CMTS). Also, the DOCSIS 3.0 security technology is based on a Baseline Privacy Interface Plus (BPI+) technology.

A DOCSIS 3.0 network supports a unicast session and a multicast session. Due to characteristics of the HFC network, data of the multicast session is broadcasted to all the cable modems included in the same cell. Therefore, when a malicious cable modem exists in cable modems connected with the same HFC network, the malicious cable modem may eavesdrop data that is being transferred to another cable modem. Specifically, a cable modem belonging to the same HFC network may receive data of another cable modem. In order to solve the above privacy problem, the DOCSIS 3.0 network defines an encrypted multicast session that encrypts a multicast stream between a CMTS and cable modems, and sends the encrypted multicast stream.

The DOCSIS 3.0 standard defines an encrypted static multicast session and an encrypted dynamic multicast session in the encrypted multicast session. The encrypted static multicast session denotes when cable modems may not dynamically join and leave while the multicast session. The encrypted dynamic multicast session denotes when the cable modems may dynamically join and leave while the multicast session. In particular, in an aspect of security, the encrypted dynamic multicast session may need forward secrecy and backward secrecy in order to support the privacy.

Figure 1:
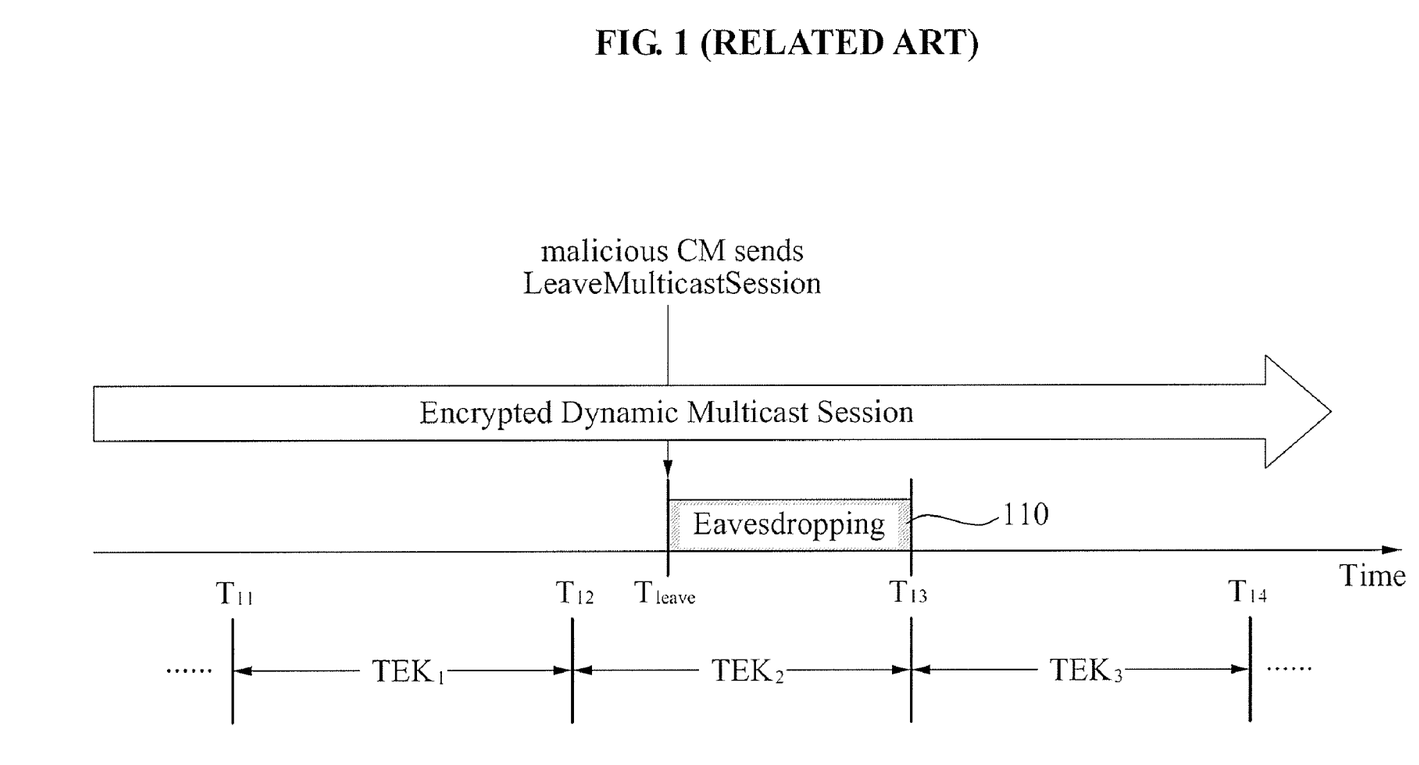
FIGS. 1 and 2 illustrate an example for describing vulnerability of forward secrecy and backward secrecy of an encrypted dynamic multicast session that may occur in a conventional Data Over Cable Service Interface Specifications (DOCSIS) 3.0 network.
Figure 2:
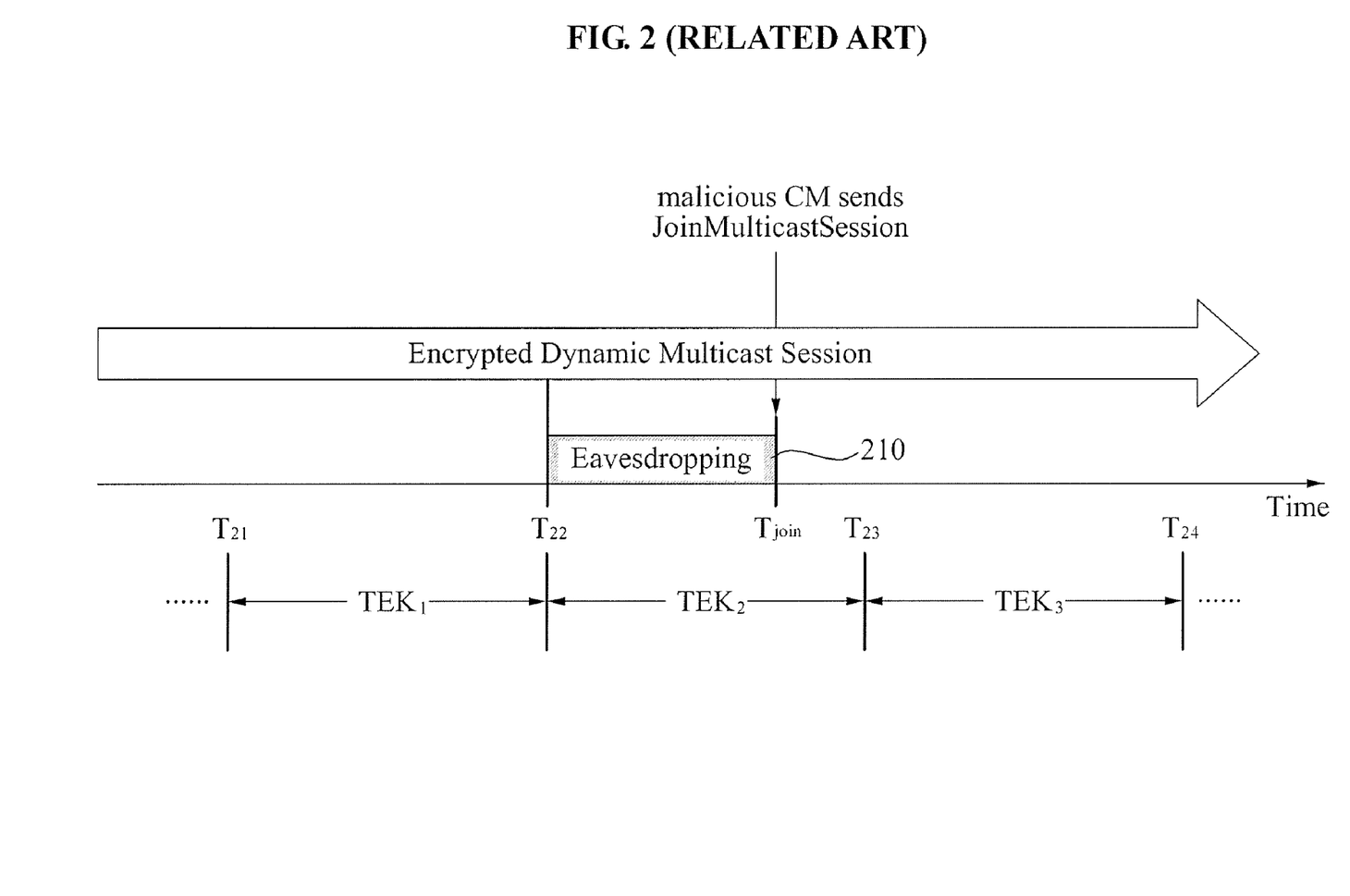

FIGS. 1 and 2 illustrate an example for describing vulnerability of the forward secrecy and the backward secrecy in the encrypted dynamic multicast session that may occur in the conventional DOCSIS3.0 network. Referring to FIG. 1, the currently published DOCSIS 3.0 standard does not define a mechanism of dynamically updating a Traffic Encryption Key (TEK). Therefore, an eavesdropping slot 110 may incur between a point in time $T_{leave}$ when the malicious cable modern sends a LeaveMulticastSession message to a CMTS and a point in time $T_{13}$ when a subsequent TEK is updated. In the eavesdropping slot 110, a cable modem that left a multicast group may be aware of eavesdrop communication contents between group members that may occur after leaving the multicast group.

Referring to FIG. 2, the currently published DOCSIS 3.0 standard does not define a mechanism of dynamically updating a TEK. Therefore, an eavesdropping slot 210 may incur between a point in time $T_{join}$ when a malicious CM sends a JoinMulticastSession message to a CMTS and a point in time $T_{22}$ when a subsequent TEK is updated. In the eavesdropping slot 210, the cable modem that joins the multicast group may be aware of communication contents between group members that occurred before joining the multicast group.

SUMMARY OF THE INVENTION

An aspect of the present invention provides a method of controlling forward secrecy by sending a LeaveMulticastSession message of a cable modem and then sending a Dynamic Bonding Change (DBC) message and updating a Traffic Encryption Key (TEK) in a cable modem termination system (CMTS).

Another aspect of the present invention also provides a method of controlling backward secrecy by sending a JoinMulticastSession message of a cable modem and then sending a DBC message and updating a TEK in a CMTS.

According to an aspect of the present invention, there is provided a security control method in a cable network dynamic multicast session, including: maintaining a multicast group that is allocated with a first Downstream Service Identifier (DSID) and a first Security Association Identifier (SAID) and that is joined by a first cable modem and a second cable modem; receiving a LeaveMulticastSession message from the second cable modem; exchanging, corresponding to the LeaveMulticastSession message, a DBC message for changing a multicast parameter with the second cable modem; and updating a first TEK corresponding to the first DSID with a second TEK.

According to another aspect of the present invention, there is provided a security control method in a cable network dynamic multicast session, including: maintaining a multicast group that is allocated with a first DSID and a first SAID and that is joined by a first cable modem; receiving a JoinMulticastSession message from a second cable modem; exchanging, corresponding to the JoinMulticastSession message, a DBC message for changing a multicast parameter with the second cable modem; and updating a first TEK corresponding to the first DSID with a second TEK.

According to still another aspect of the present invention, there is provided a cable network system including: a cable modem unit including a first cable modem and a second cable modem that join the same multicast group; and a CMTS to forward a data packet to the cable modem unit via a cable network, exchange a DBC message with the second cable modem when a LeaveMulticastSession message is received from the second cable modem, and to update a TEK, wherein the CMTS exchanges a key message and the DBC message corresponding to the updated TEK with the first cable modem to thereby change a multicast parameter.

According to yet another aspect of the present invention, there is provided a cable network system including: a cable modem unit including a first cable modem that joins the same multicast group; and a CMTS to forward a data packet to the cable modem unit via a cable network, exchange a DBC message and a key message with a second cable modem when a JoinMulticastSession message is received from the second cable modem, and to update a TEK, wherein the CMTS exchanges the key message and the DBC message corresponding to the updated TEK with the first cable modem to thereby change a multicast parameter.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

When it is determined detailed description related to a related known function or configuration they may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

The term "Traffic Encryption Key (TEK)" used herein denotes an encryption key to encrypt a Data Over Cable Service Interface Specifications (DOCSIS) data packet.

Also, the term "Downstream Bonding Change Request (DBC-REQ) message denotes a message that is sent from a cable modem termination system (CMTS) to thereby add or delete cable modem (CM) entitlement in a given dynamic multicast session.

Also, the term "Downstream Bonding Change Response (DBC-RSP) message denotes a response message that is sent from a CM in response to the DBC-REQ message.

Also, the term "Downstream Bonding Change Acknowledgement (DBC-ACK) message denotes an acknowledgement message that is sent from the CMTS in response to the DBC-RSP message.

Also, the term "Security Association Identifier (SAID)" denotes an identifier that is used to identify an encryption group shared between the CMTS and the CM.

Also, in this invention, a cable network will be described in association with only a DOCSIS network.

Figure 3:
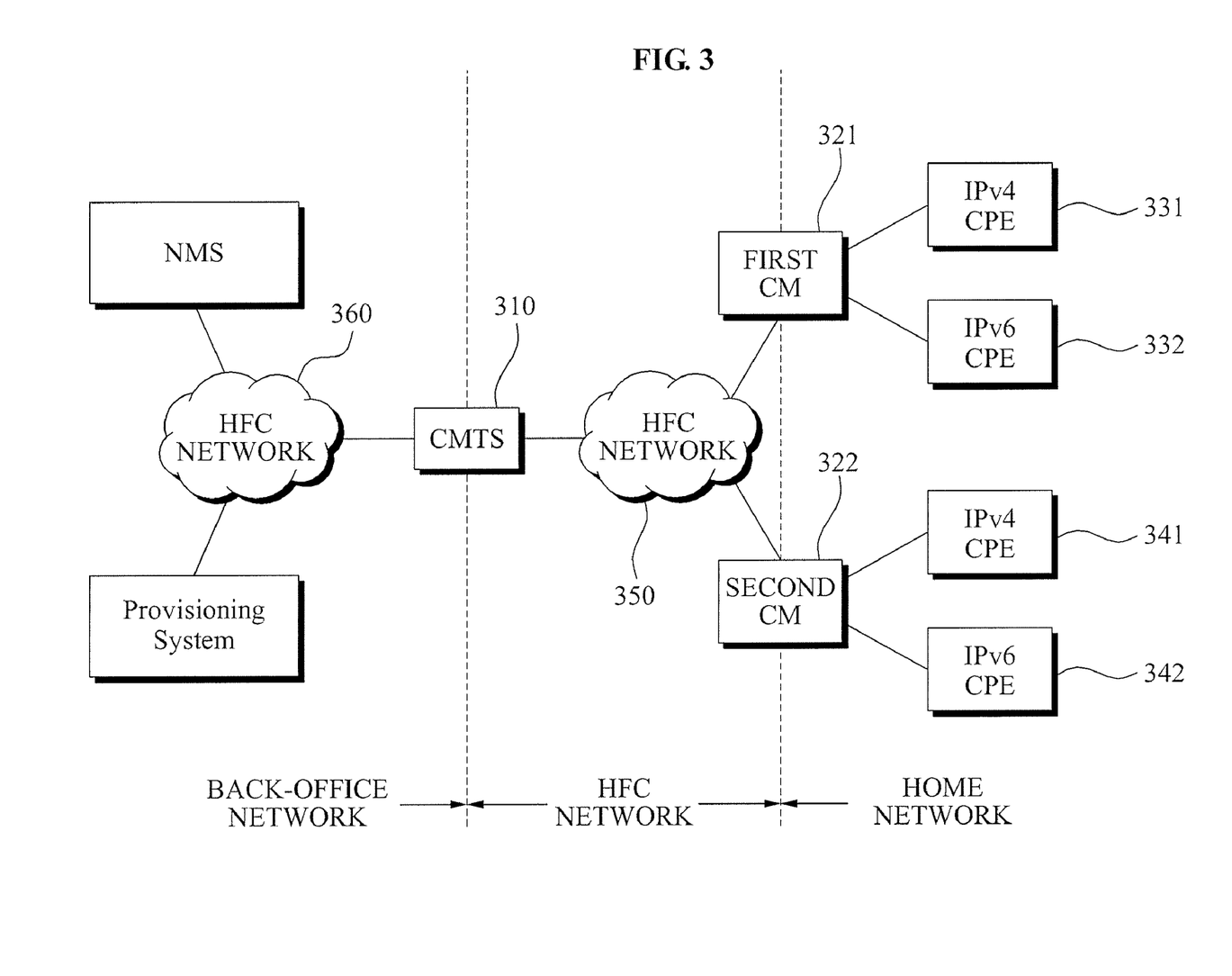
FIG. 3 is a block diagram of a DOCSIS network in which security control in a dynamic multicast session can be performed according to an embodiment of the present invention.

FIG. 3 is a block diagram of a DOCSIS network in which security control in a dynamic multicast session can be performed according to an embodiment of the present invention.

Referring to FIG. 3, the DOCSIS network includes a back-office network, a hybrid fiber coax (HFC) network, and a home network. A first CM 321 and a second CM 322 are connected with an HFC network 350 of an operator to bridge packets to the home network.

Many Customer Premises Equipments (CPEs) 331, 332, 341, and 342 are connected with a local area network (LAN) interface of a CM to thereby be configured as a single device or a standalone device with the CM. The CPEs 331, 332, 341, and 342 may use an Internet Protocol version 4 (IPv4), an IPv6, and an IP address. The CPEs 331, 332, 341, and 342 may be a home router, a set-top device, or a personal computer (PC).

A CMTS 310 may be connected with the back-office network or a core network of the operator via HFC networks 350 and 360. The CMTS 310 may forward a packet between two domains, that is, between the back-office network and the core network, or between an upstream channel and a downstream channel.

In FIG. 1, it is assumed that a first Downstream Service Identifier (DSID) and a first Security Association Identifier (SAID) are allocated to a multicast group. Here, DSID denotes identification information that can identify a packet stream distributed in the same CM with 20 bits of a DOCSIS extended header, or a group of the CM. Also, SAID denotes 14-bit handle information that can identify security association between the CMTS and the CM.

When the second CM 322 sends a LeaveMulticastSession message to the CMTS 310 to leave the multicast group, the CMTS 310 may exchange a DBC message for changing a multicast parameter with the second CM 322. After exchanging the DBC message, the CMTS 310 may update a first TEK corresponding to the first DSID with a second TEK. The CMTS 310 may exchange a DBC message for corresponding to the second TEK with the first CM 321 of the multicast group. Through this, it is possible to prevent the second CM 322 from eavesdropping multicast data after the second CM 322 leaves the multicast group.

When the second CM 322 desires to join the multicast group joined by the first CM 321, the second CM 322 may send a JoinMulticastSession message to the CMTS 310. Corresponding to the JoinMulticastSession message, the CMTS 310 may exchange a DBC message for changing a multicast parameter with the second CM 322. After exchanging the DBC message, the CMTS 310 may update the first TEK corresponding to the first DSID with the second TEK. Next, the CMTS 310 may exchange a DBC message for corresponding to the second TEK with the first CM 321 of the multicast group. Through this, it is possible to prevent the second CM 322 from eavesdropping previous multicast data before the second CM 322 joins the multicast group. Herein-after, a method of controlling forward secrecy and backward secrecy will be described in detail.

Figure 4:
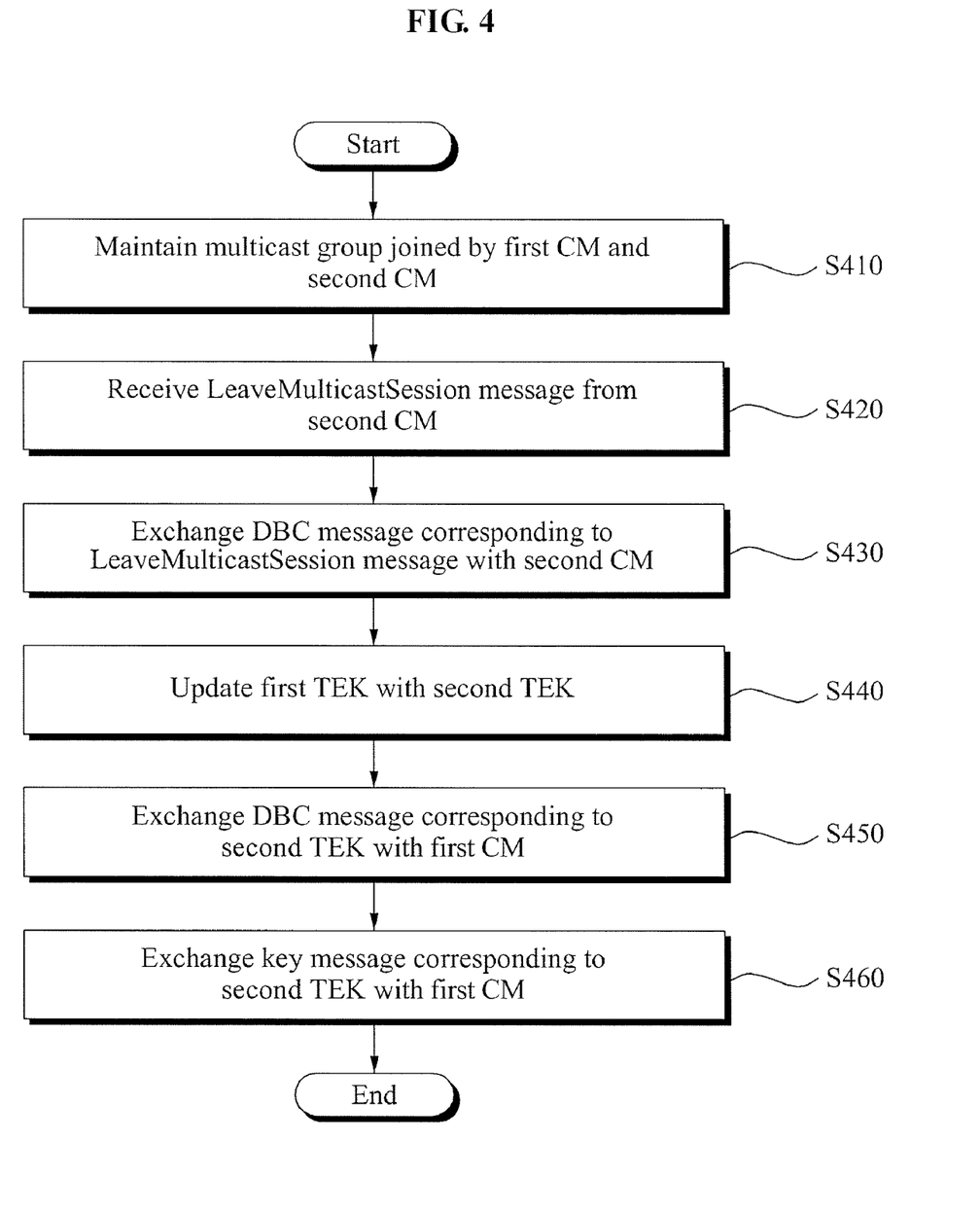
FIG. 4 is a flowchart illustrating a method of controlling forward secrecy in a DOCSIS network dynamic multicast session according to an embodiment of the present invention.

FIG. 4 is a flowchart illustrating a method of controlling forward secrecy in a DOCSIS network dynamic multicast session according to an embodiment of the present invention.

Referring to FIG. 4, in operation S410, a multicast group may be maintained. The multicast group is allocated with a first DSID and a first SAID and is joined by a first CM and a second CM.

In operation S420, a CMTS may receive a LeaveMulticastSession message from the second CM that desires to leave the multicast group.

In operation S430, the CMTS that receives the LeaveMulticastSession message may exchange, corresponding to the LeaveMulticastSession message, a DBC message for changing a multicast parameter with the second CM.

In operation S440, the CMTS may update a first TEK corresponding to the first DSID with a second TEK.

In operation S450, the CMTS may exchange a DBC message corresponding to the updated second TEK for changing the multicast parameter with the first CM. In this case, the first CM may set a first TEK refresh timer corresponding to the first SAID to zero and thereby expire the first TEK refresh timer. Through this, it is possible to prevent the second CM from eavesdropping multicast data after leaving the multicast group.

In operation S460, the CMTS may exchange a key message corresponding to the second TEK with the first CM to thereby control forward privacy in the DOCSIS network dynamic multicast session. The above-described method of controlling the forward secrecy between the CMTS and the CM will be further described in detail with reference to FIG. 5.

Figure 5:
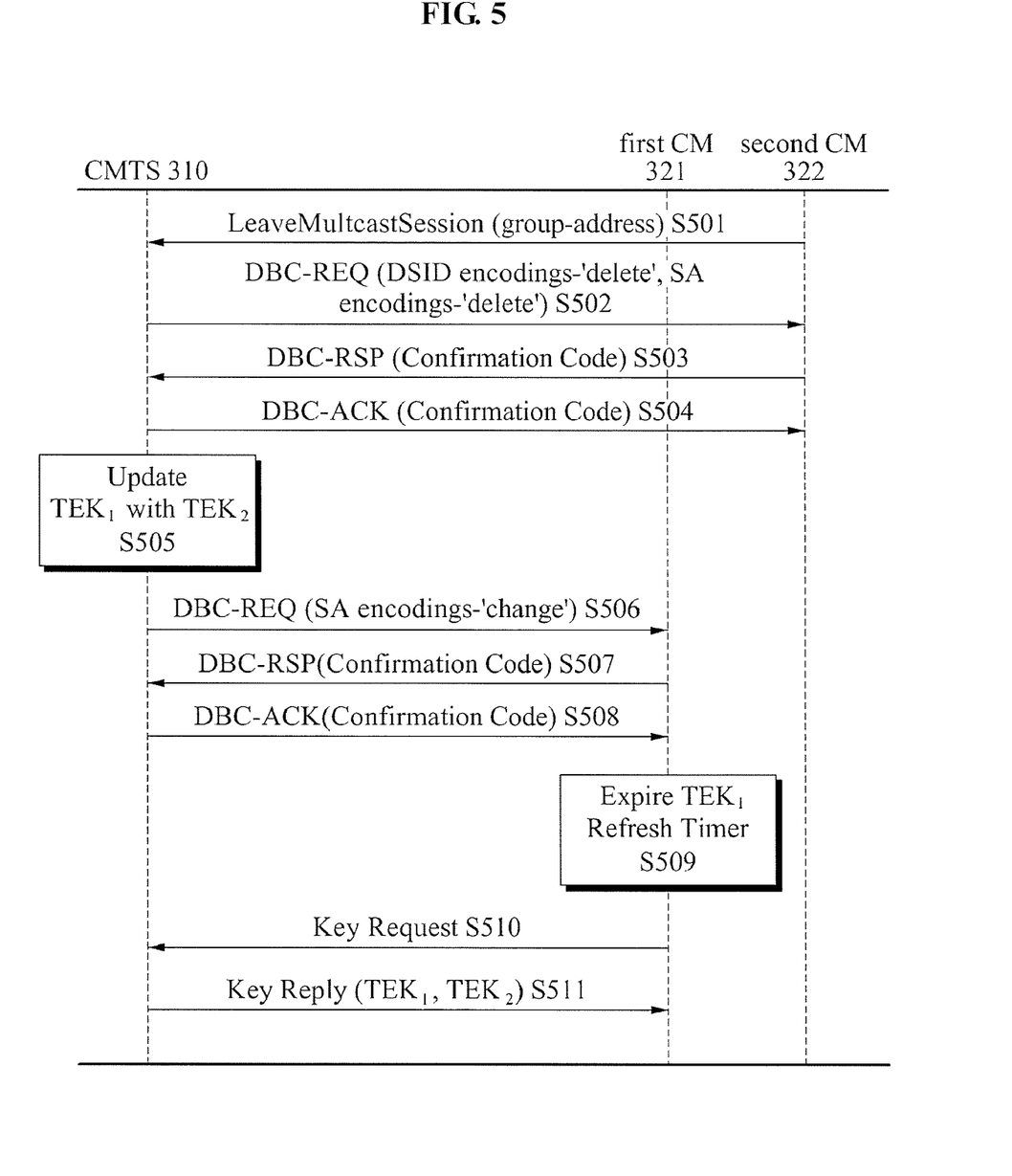
FIG. 5 illustrates a process of controlling forward secrecy between a cable modem termination system (CMTS) and a cable modem (CM) in a DOCSIS network dynamic multicast session according to an embodiment of the present invention.

FIG. 5 illustrates a process of controlling forward secrecy between a CMTS and a CM in a DOCSIS network dynamic multicast session according to an embodiment of the present invention.

Referring to FIG. 5, a dynamic multicast session maintains a multicast group that is allocated with a first DSID and a first SAID, and that is joined by a first CM 321 and a second CM 322.

In operation S501, the second CM that desires to leave the multicast group may send a LeaveMulticastSession message to a CMTS 310. The CMTS 310 that receives the LeaveMulticastSession message may exchange, corresponding to the LeaveMulticastSession message, a DBC message for changing a multicast parameter with the second CM.

Specifically, in operation S502, the CMTS 310 may send a DBC-REQ message corresponding to the LeaveMulticastSession message to the second CM 322.

In operation S503, the second CM 322 may send a DBC-RSP message corresponding to the LeaveMulticastSession message to the CMTS 310.

In operation S504, the CMTS 310 may send a DBC-ACK message corresponding to the LeaveMulticastSession message to the second CM 322. The DBC-REQ message corresponding to the LeaveMulticastSession message may include command information to delete entitlement information in the multicast group.

In operation S505, the CMTS 310 may update a first TEK $TEK_1$ corresponding to the first DSID with a second TEK $TEK_2$. Next, the CMTS 310 may exchange the DBC message corresponding to the updated second TEK and for changing the multicast parameter with the first CM 321. Specifically, in operation S506, the CMTS 310 may send a DBC-REQ message corresponding to the second TEK to the first CM 321. The DBC-REQ message corresponding to the second TEK may include command information to update the first TEK with the second TEK. When the first CM 321 sends a DBC-RSP message corresponding to the second TEK to the CMTS 310 in operation S507, the CMTS 310 may send a DBC-ACK message corresponding to the second TEK to the first CM 321 in operation S508.

In operation S509, the first CM 321 may set a first TEK refresh timer corresponding to the first SAID to zero and thereby expire the first TEK refresh timer. The CMTS 310 and the first CM (CM1) 321 may exchange a key message corresponding to the second TEK. Specifically, in operation S510, the first CM 321 may send a key request message to the CMTS 310. In operation S511, the CMTS 310 may send a key reply message to the first CM 321.

Figure 6:
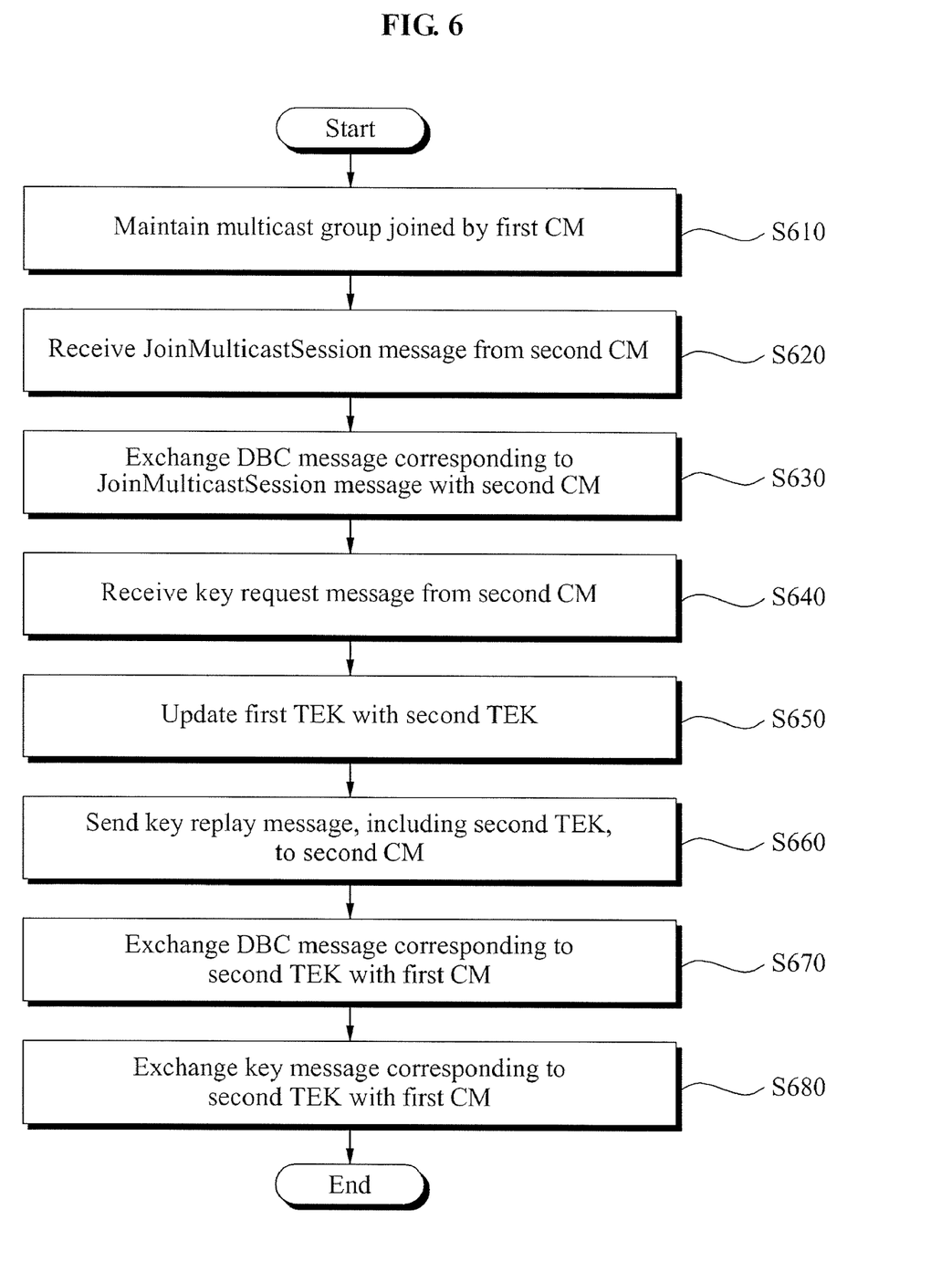
FIG. 6 is a flowchart illustrating a method of controlling backward secrecy in a DOCSIS network dynamic multicast session according to an embodiment of the present invention.

FIG. 6 is a flowchart illustrating a method of controlling backward secrecy in a DOCSIS network dynamic multicast session according to an embodiment of the present invention.

Referring to FIG. 6, in operation S610, a multicast group may be maintained. The multicast group is allocated with a first DSID and a first SAID and is joined by a first CM. In operation S620, a CMTS may receive a JoinMulticastSession message from a second CM that desires to join the multicast group. In operation S630, the CMTS that receives the JoinMulticastSession message may exchange, corresponding to the JoinMulticastSession message, a DBC message for changing a multicast parameter with the second CM. In operation S640, the second CM may send a Baseline Privacy Key Management(BPKM) key request message to the CMTS.

In operation S650, the CMTS may update a first TEK corresponding to the first DSID with a second TEK. In operation S660, the CMTS may send a Baseline Privacy Key Management(BPKM) key reply message, including the second TEK, to the second CM. In operation S670, the CMPTS may exchange a DBC message corresponding to the second TEK with the first CM. In this case, a process of setting, by the first CM, a first TEK refresh timer corresponding to the first SAID to zero to thereby expire the first TEK refresh timer may be further included. In operation S680, the CMTS may exchange a key message corresponding to the second TEK with the first CM to thereby control backward privacy in the DOCSIS network dynamic multicast session. The above-described method of controlling the backward secrecy between the CMTS and the CM will be further described in detail with reference to FIG. 7.

Figure 7:
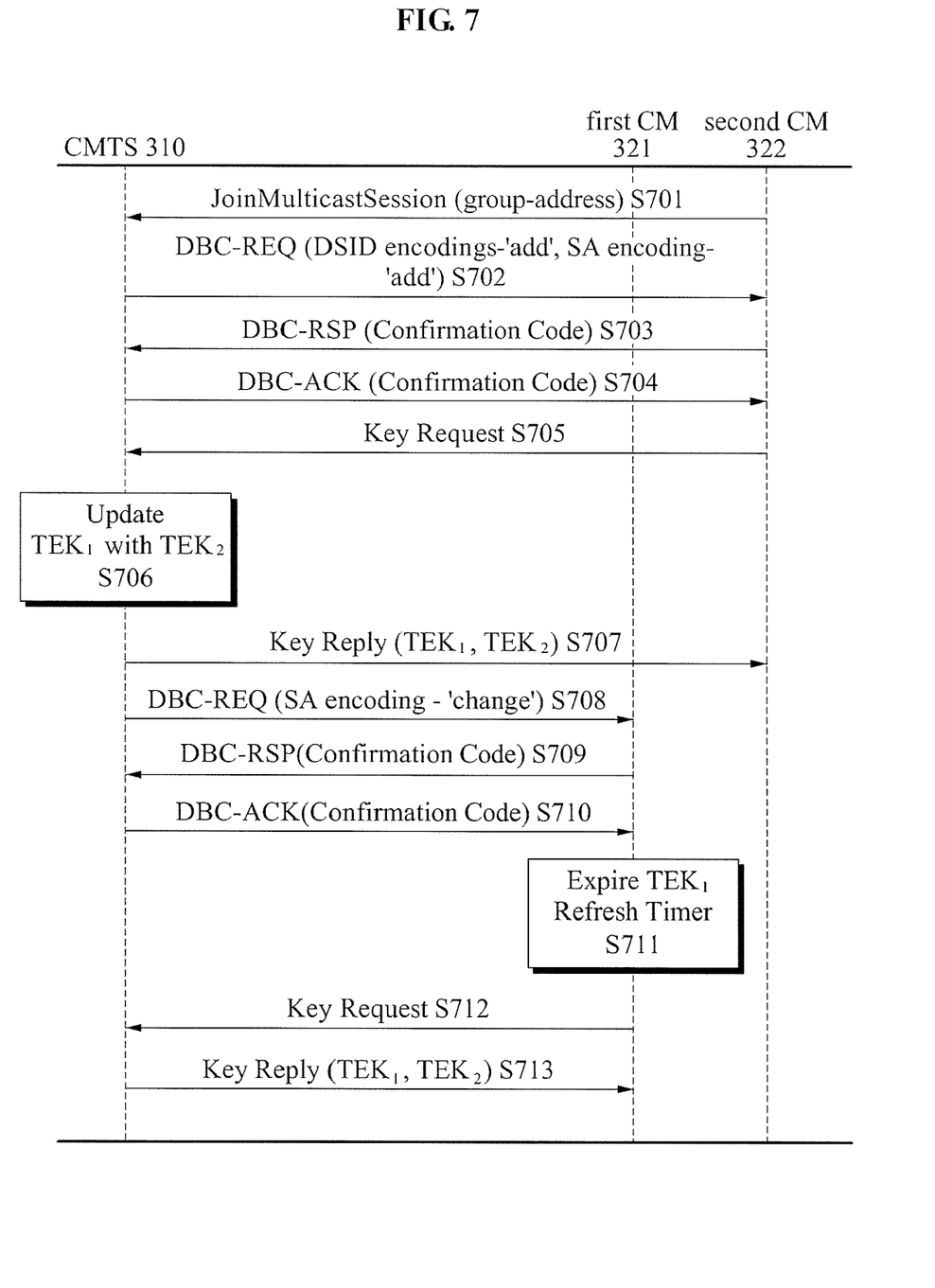
FIG. 7 illustrates a process of controlling backward secrecy between a CMTS and a CM in a DOCSIS network dynamic multicast session according to an embodiment of the present invention.

FIG. 7 illustrates a process of controlling backward secrecy between a CMTS and a CM in a DOCSIS network dynamic multicast session according to an embodiment of the present invention.

Referring to FIG. 7, a multicast group is allocated with a first DSID and a first SAID, and that is joined by a first CM 321.

In operation S701, a second CM 322 that desires to join the multicast group may send a JoinMulticastSession message to a CMTS 310. The CMTS 310 that receives the JoinMulticastSession message may exchange, corresponding to the JoinMulticastSession message, a DBC message for changing a multicast parameter with the second CM 322.

Specifically, in operation S702, the CMTS 310 may send a DBC-REQ message corresponding to the JoinMulticastSession message to the second CM 322. When the second CM 322 sends a DBC-RSP message to the JoinMulticastSession message to the CMTS 310 in operation S703, the CMTS 310 may send a DBC-ACK message to the second CM 322 in operation S704. The DBC-REQ message corresponding to the JoinMulticastSession message may include command information to add entitlement information of a security multicast group.

In operation S705, the second CM 322 may send a key request message to the CMTS 310. In operation S706, the CMTS 310 may update a first TEK $TEK_1$ corresponding to the first DSID with a second TEK $TEK_2$. In operation S707, the second CM 322 may send a key reply message, including the second TEK, to the second CM 322.

Next, the CMTS 310 may exchange a DBC message corresponding to the second TEK with the first CM 321. Specifically, in operation S708, the CMTS 310 may send a DBC-REQ message corresponding to the second TEK to the first CM (CM1). The DBC-REQ message corresponding to the second TEK may include command information to update the first TEK with the second TEK.

In operation S709, the first CM 321 may send a DBC-RSP message corresponding to the second TEK to the CMTS 310.

In operation S710, the CMTS 310 may send a DBC-ACK message corresponding to the second TEK to the first CM (CM1) 321.

In operation S711, the first CM (CM1) 321 may set a first TEK refresh timer corresponding to the first SAID to a zero and thereby expire the first TEK refresh timer.

The CMTS 310 may exchange a key message corresponding to the second TEK with the first CM 321. Specifically, in operation S712, the first CM 321 may send a key request message to the CMTS 310. In operation S713, the CMTS 310 may send a key reply message, including the second TEK, to the first CM (CM1) 321.

According to the present invention, it is possible to control backward secrecy by sending a DBC message and updating a TEK in a CMTS after a CM sends a JoinMulticastSession message.

The security control method in the DOCSIS network dynamic multicast session according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, there is provided a method of controlling forward secrecy by sending a LeaveMulticastSession message of a cable modem and then sending a DBC message and updating a TEK in a CMTS.

Also, according to the present invention, there is provided a method of controlling backward secrecy by sending a JoinMulticastSession message of a cable modem and then sending a DBC message and updating a TEK in a CMTS.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A security control method in a cable network dynamic multicast session, comprising:
   maintaining a multicast group that is allocated with a first Downstream Service Identifier (DSID) and a first Security Association Identifier (SAID) and that is joined by a first cable modem and a second cable modem;
   receiving a LeaveMulticastSession message from the second cable modem; exchanging, corresponding to the LeaveMulticastSession message, a Dynamic Bonding Change (DBC) message for changing a multicast parameter with the second cable modem;
   updating a first Traffic Encryption Key (TEK) corresponding to the first DSID with a second TEK; and
   exchanging the DBC message corresponding to the second TEK for changing the multicast parameter with the first cable modem.

2. The method of claim 1, wherein the exchanging comprises:
   sending a DBC-request (REQ) message corresponding to the LeaveMulticastSession message to the second cable modem;
   receiving a DBC-response (RSP) message corresponding to the LeaveMulticastSession message from the second cable modem; and
   sending a DBC-acknowledgement (ACK) message corresponding to the LeaveMulticastSession message to the second cable modem.

3. The method of claim 2, wherein the DBC-REQ message corresponding to the LeaveMulticastSession message includes command information to delete entitlement information of a security multicast group.

4. The method of claim 1, wherein the exchanging of the DBC message comprises:
   sending a DBC-request (REQ) message corresponding to the second TEK to the first cable modem;
   receiving a DBC-response (RSP) message corresponding to the second TEK from the first cable modem; and
   sending a DBC-acknowledgement (ACK) message corresponding to the second TEK to the first cable modem.

5. The method of claim 4, wherein the DBC-REQ message corresponding to the second TEK includes command information to update the first TEK with the second TEK.

6. The method of claim 1, wherein the first cable modem expires a first TEK refresh timer corresponding to the first SAID after exchanging the DBC message corresponding to the second TEK.

7. The method of claim 1, further comprising:
   exchanging a key message corresponding to the second TEK with the first cable modem.

8. The method of claim 7, wherein the exchanging of the key message comprises:
   receiving a key request message from the first cable modem; and
   sending a key reply message to the first cable modem.

9. A security control method in a cable network dynamic multicast session, comprising:
   maintaining a multicast group that is allocated with a first Downstream Service Identifier (DSID) and a first Security Association Identifier (SAID) and that is joined by a first cable modem;
   receiving a JoinMulticastSession message from a second cable modem;
   exchanging, corresponding to the JoinMulticastSession message, a Dynamic Bonding Change (DBC) message for changing a multicast parameter with the second cable modem;

updating a first Traffic Encryption Key (TEK) corresponding to the first DSID with a second TEK; and exchanging the DBC message corresponding to the second TEK with the first cable modem.

10. The method of claim 9, wherein the exchanging of the DBC message comprises:

sending a DBC-request (REQ) message corresponding to the JoinMulticastSession message to the second cable modem;

receiving a DBC-response (RSP) message corresponding to the JoinMulticastSession message from the second cable modem; and sending a DBC-acknowledgement (ACK) message corresponding to the JoinMulticastSession message to the second cable modem.

11. The method of claim 10, further comprising:

receiving a key request message for a cable modem termination system (CMTS) from the second cable modem.

12. The method of claim 10, wherein the DBC-REQ message corresponding to the JoinMulticastSession message includes command information to add entitlement information of a security multicast group.

13. The method of claim 9, wherein the updating comprises:

sending a key reply message, including the second TEK, to the second cable modem.

14. The method of claim 9, wherein the exchanging of the DBC message comprises:

sending a DBC-REQ message corresponding to the second TEK to the first cable modem;

receiving a DBC-RSP message corresponding to the second TEK from the first cable modem; and sending a DBC-ACK message corresponding to the second TEK to the first cable modem.

15. The method of claim 14, wherein the DBC-REQ message corresponding to the second TEK includes command information to update the first TEK with the second TEK.

16. The method of claim 14, wherein the first cable modem expires a first TEK refresh timer corresponding to the first SAID after exchanging the DBC message corresponding to the second TEK.

17. The method of claim 9, further comprising:

exchanging a key message, corresponding to the second TEK, between a CMTS and the first cable modem.

18. The method of claim 17, wherein the exchanging of the key message comprises:

sending a key request message from the first cable modem to the CMTS; and sending a key reply message, including the second TEK, from the CMTS to the first cable modem.

19. A security control method in a cable network dynamic multicast session, comprising:

maintaining a multicast group including a cable model termination system (CMTS), wherein the multicast group is allocated with a first Downstream Service Identifier (DSID) and a first Security Association Identifier (SAID) and that is joined by a first cable modem and a second cable modem;

receiving a LeaveMulticastSession message from the second cable modem by the CMTS;

exchanging, corresponding to the LeaveMulticastSession message, a Dynamic Bonding Change (DBC) message for changing a multicast parameter between the CMTS and the second cable modem;

updating a first Traffic Encryption Key (TEK) corresponding to the first DSID with a second TEK; and exchanging the DBC message corresponding to the second TEK for changing the multicast parameter between the CMTS and the first cable modem.

* * * * *